June 9, 1953 R. J. KIRCHER 2,641,712
PHOTOELECTRIC DEVICE
Filed July 13, 1951
FIG. 1
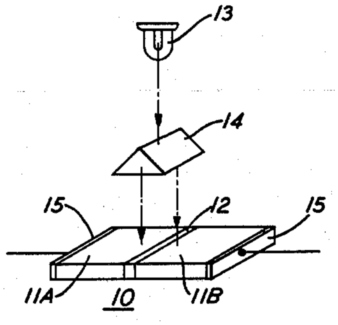
FIG. 2
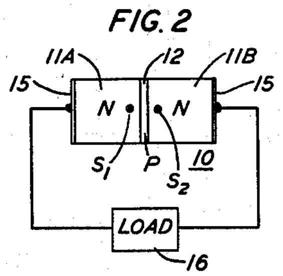
FIG. 3
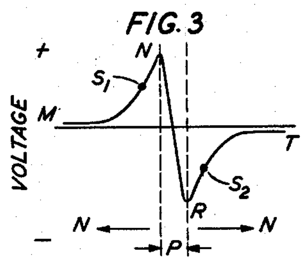
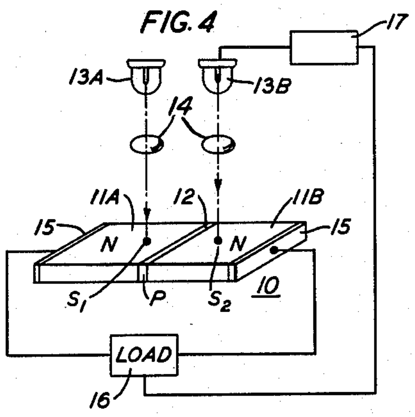
FIG. 5
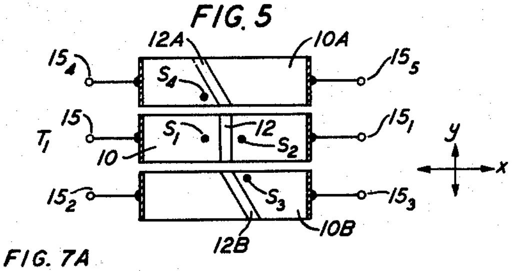
FIG. 6
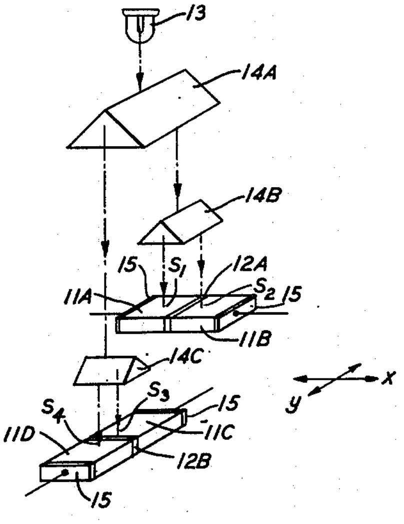
FIG. 7A
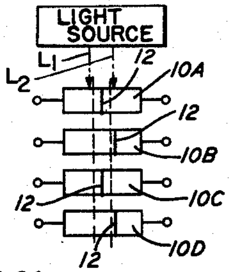
FIG. 7B
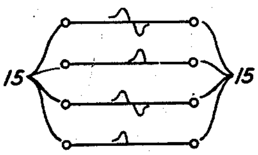
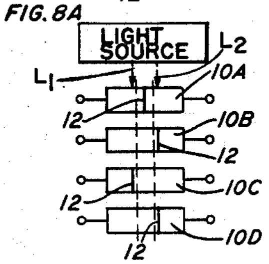
FIG. 8B
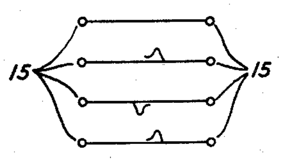
INVENTOR
R. J. KIRCHER
BY R. J. Guenther
ATTORNEY Patented June 9, 1953 2,641,712

UNITED STATES PATENT OFFICE 2,641,712

PHOTOELECTRIC DEVICE

Reymond J. Kircher, Summit, N. J., assignor to Bell Telephone Laboratories, Incorporated, New York, N. Y., a corporation of New York Application July 13, 1951, Serial No. 236,616

9 Claims. (Cl. 250—204)

This invention relates to photoelectric devices and more particularly to such devices wherein the active element is a body of semiconductive material.

Known in the art, as evidenced for example by Patent 2,402,662 granted June 25, 1946, to R. S. Ohl, are photoelectric cells comprising a body of semiconductive material, such as germanium or silicon, having therein two or more zones or regions of opposite conductivity types. In such known devices, the potential appearing between the end zones is controllable by the action of a light beam or spot directed against the body at or in proximity to the junction or barrier between two adjacent zones of opposite conductivity types. Within the band of light frequency sensitivity the photovoltage established is dependent upon both the intensity of the beam or spot and the distance between the point of incidence thereof and the junction or barrier. In cases where the body comprises a pair of zones of one conductivity type on opposite sides of and contacting a third zone of the opposite conductivity type, the sign of the voltage developed depends upon which side the point of incidence for the light beam occurs.

Advantageously, in devices of the type last described, the intermediate zone is made very thin. In this case, the change in voltage with position of the beam or spot is very sharp. Hence, control of the spot position to obtain voltage changes within prescribed limits is difficult as a practical matter. In applications where the spot position and the consequent voltage changes are used in tracking, establishment of an equilibrium beam or spot position and prevention of extensive hunting action is difficult to realize. Also for such devices the light beam or spot necessarily is of small transverse dimensions. This, from a practical standpoint, places restrictions upon the response that can be obtained.

One general object of this invention is to improve the performance characteristics of semiconductor photoresponsive devices. More specifically, objects of this invention are to expedite the realization of relatively large responses from photosensitive semi-conductor devices wherein the semi-conductive body includes zones of opposite conductivity types, to facilitate and improve the control of the response of such devices and to reduce hunting in and increase the stability of tracking systems including photoresponsive semi-conductor devices.

In one illustrative embodiment of this invention, a photocell comprises a body of germanium having therein a thin zone of P conductivity type flanked by and contacting with two zones of N conductivity type. Two concentrated light beams are directed against the body, each beam impinging upon a respective one of the N-type zones and advantageously in proximity to the junction between that zone and the P zone. The photovoltage appearing between the two N zones is dependent upon the position of both beams, its magnitude being determined by the algebraic sum of the two components due to the individual beams.

The two light beams may emanate from the same or common source and the voltage developed used to track this source. In another embodiment, one beam may be used as a master or reference and the other as a slave, the intensity of which is maintained at a preassigned value by control of its energizing source in accordance with the voltage appearing across the semi-conductive body. In still another embodiment, the device may be utilized to indicate coincidences, anticoincidences or sequential occurrences, as in coding systems.

The invention and the several features thereof will be understood more clearly and fully from the following detailed description with reference to the accompanying drawing in which:

Fig. 1 is a perspective view showing principal components of a photosensitive device illustrative of one embodiment of this invention;

Fig. 2 is in part a diagram and in part a plan view of the semiconductive body shown in Fig. 1;

Fig. 3 is a graph portraying characteristics of the semi-conductor device illustrated in Fig. 1;

Fig. 4 depicts in perspective principal components of a device illustrative of another embodiment of this invention and involving master and slave beams;

Fig. 5 is a plan view of a semiconductor device, illustrative of another embodiment of this invention, particularly useful for effecting tracking a light source in two coordinate directions;

Fig. 6 is a perspective view showing components of a system illustrative of another embodiment of this invention including a semiconductor device similar to that illustrated in Fig. 5; and Figs. 7 and 8 are diagrams illustrating other embodiments of this invention particularly suitable for use in code translating systems.

Referring now to the drawing the photoresponsive device illustrated in Figs. 1 and 2 comprises a body 10 of semiconductive material, advantageously germanium, having therein two zones 11A and 11B of like conductivity type as indicated in Fig. 2 and an intermediate zone 12 between and forming junctions with the zones 11, the intermediate zone being of conductivity type opposite that of the outer zones, specifically of P-type as indicated in Fig. 2. Light from a source 13 is directed through a suitable prism or lens system 14 whereby it is divided into two beams incident upon the semiconductive body 10 on opposite sides of the intermediate zone 12. The two beam positions are indicated by the points $S_1$ and $S_2$ in Fig. 2. Terminals 15, for example rhodium or copper platings, are applied to the N zones 11 and have connected therebetween a load 16.

The body 10, as noted hereinabove, advantageously is of germanium and the zone 12 therein may be a natural grain boundary in a wafer of germanium material prepared for example in the manner disclosed in the application Serial No. 638,351 filed December 29, 1945, now Patent 2,602,211, granted July 8, 1952, of J. H. Scaff and H. C. Theuerer. Alternatively, the P zone 12 may be a synthetic boundary produced for example in the manner disclosed in the application Serial No. 136,038 filed December 30, 1949, of W. G. Pfann and H. C. Theuerer. Or the N-P-N germanium body may be fabricated in the manner disclosed in the application Serial No. 168,184 filed June 15, 1950, of G. K. Teal.

In a specific and illustrative embodiment, the semiconductive body may be a rectangular wafer or slab 0.10 inch long, .05 inch wide and .05 inch thick and the intermediate or P zone 12 may have a thickness of about .0005 inch. Particularly advantageously the N zones 11 are of substantially the same resistivity. For example in a typical device the N zones may have a resistivity of the order of 10 ohm centimeter and the P zone 12 may have a resistivity of the order of 1 ohm centimeter.

The semiconductive body is photoresponsive. Specifically the voltage appearing between the terminals 15 is variable in accordance with the intensity of a light beam or spot incident upon the surface of the body and is dependent upon the position of the spot relative to the junction or junctions between the N zones on the one hand and the P zone on the other. The relation between voltage and light intensity is substantially linear, the device being responsive to wavelengths extending from the infra-red to about 1.8 angstrom units.

The relation between the voltage between the terminals 15 and position of a light beam or spot incident upon the surface, specifically the upper surface in Fig. 1, of the semiconductive body is depicted in Fig. 3 wherein the voltage appears as ordinate and the position is plotted as abscissa. In Fig. 3 the positions of the N and P zones are indicated. It will be noted from Fig. 3 that if a beam of light is moved along the surface of the body, say from the left-hand end in Fig. 2, the voltage appearing between the terminals 15 increases from a very small value at M to a maximum at N, which corresponds to the position of the beam at the junction of the zone 11A and the zone 12. Then as the beam traverses or passes over the P zone 12 it decreases to zero and then increases to a maximum negative value indicated at R, which corresponds to a position at the junction between the zone 12 and the zone 11B. Thereafter as the spot or beam continues to move to the right the voltage decreases to a minimum value indicated at T. When the N zones are of substantially the same resistivity and carrier lifetime the characteristic as portrayed in Fig. 3 is substantially symmetrical about the mid-point of the P zone 12.

When, as in the embodiment illustrated in Fig. 1, two light beams indicated at $S_1$ and $S_2$ in Figs. 2 and 3 are directed against the semiconductive body 10, the photovoltage appearing between the terminals 15 will be dependent upon the position of both the beams relative to the P zone 12 and any change in the relative position of these beams or concurrent displacement thereof in amplitude or direction will result in corresponding changes in the potential developed between the terminals 15. Thus, this potential is a measure of the position of the light source 13 relevant to the semiconductor. Hence, the device illustrated may be utilized to determine the position of a light source relative to a fixed point or by control of the position of the body 10 or directional indicator of known constructions in accordance with the voltage developed, the light source may be tracked.

In another embodiment illustrated in Fig. 4, two light beams from separate sources may be utilized and the intensity of one source controlled in accordance with the voltage developed between the terminals 15 so that this intensity is maintained at a fixed ratio to the intensity of the other light source. Specifically, referring to Fig. 4, source 13A serves as a master or reference and the beam therefrom is focussed upon the semiconductive body 10 at a fixed point $S_1$; the controlled or slave beam emanates from a source 13B and is similarly focussed upon a point $S_2$. The intensity of the source 13B is controlled by a suitable source 17. It will be apparent from the characteristic portrayed in Fig. 3 that a variation in intensity of the beam from source 13B and incident at the point $S_2$ is equivalent to a change in the position of this beam relative to the junction between the zone 11B and the zone 12. Thus, such change in intensity will be reflected in a change in the potential appearing between the terminals 15. This change in potential effective upon the load 16, which may be a suitable control, functions to vary the source 17 whereby the intensity of the beam emanating from light source 13B is restored to the prescribed value, that is a value of preassigned ratio to the intensity of the light emanating from the master or reference source 13A.

The combination of master and slave light beams illustrated in Fig. 4 and above described may be utilized in a variety of applications, for example in photographic exposure control processes, in stage light intensity control systems and in infra-red baking processes.

It will be noted from Fig. 3 that the slope of the characteristic for substantial distances to either side of the points $S_1$ and $S_2$ is nearly linear whereby a substantially linear range of operation is realizable. The slope of this region is much less than that in the region between points N and R whereby, although high sensitivity is realized, equilibrium positions and stability of operation are readily attained. The regions over which sensitive variations are obtainable are relatively wide so that light beams or spots of relatively large diameters may be utilized. Also because of this extent of the regions, substantial excursions of the light beams or spots are possible without passing of the beams or spots beyond the regions over which differential control is obtained.

The invention may be utilized also to effect control or tracking in two coordinate dimensions by utilizing two N-P-N semiconductive bodies having their intermediate zones angularly related. One illustrative construction is shown in Fig. 5 and includes three semiconductor bodies 10, 10A and 10B each having therein a P-type zone 12 sandwiched between and contiguous with a pair of N-type zones 11. As shown in Fig. 5, the P-type zones 12A and 12B of the bodies 10A and 10B respectively, extend parallel to each other and at right angles to the zone 12 in the body 10. Four light beams are obtained from a common source 13, for example as shown in Fig. 6 through the use of appropriate bi-refringent prisms 14, 14A and 14B, the points of incidence of these beams upon the semiconductive bodies being indicated at $S_1$, $S_2$, $S_3$ and $S_4$ in Fig. 5.

The operation of the device illustrated in Fig. 5 will be understood from the following considerations: Assume that the semiconductive bodies are positioned relative to the coordinate axes, X and Y, as indicated in these figures. The potential appearing between terminals 15 and $15_1$ will be determined by the positions of the light beams $S_1$ and $S_2$ and thus will be a measure of the position of the source 13 in the X direction. The potential appearing between the terminals $15_2$ and $15_3$ will be dependent upon the position of the light beam $S_3$ relative to the P zone 12B and, similarly, the potential between terminals $15_4$ and $15_5$ will be dependent upon the position of the light beam with respect to the zone 12A. The beams $S_1$ and $S_2$ move together and, similarly, the beams $S_3$ and $S_4$ move together, with displacement of the source 13 relative to the semiconductor bodies. It will be noted that as one beam, say $S_3$, approaches the one 12B, the beam $S_4$ recedes from its associated P zone 12A, so that the signs of the changes in the potentials across the respective semiconductive bodies are opposite. Thus, displacement of the beam $S_3$ results in a change representative of $-\Delta Y$ and displacement of the beam $S_4$ results in a change representative of $+\Delta Y$ in the potential across the respective body. Hence, the two components, $-\Delta Y$ and $+\Delta Y$, in combination provide a measure of the position of the source 13 in the Y coordinate. The two resultant voltages, one representative of the X coordinate and the other representative of the Y coordinate, may be utilized to track a moving light source 13.

Although in the particular two coordinate system illustrated in Fig. 5 three semiconductor bodies are utilized, voltages representative of light source displacements in two dimensions can be realized by use of a greater or lesser number of N-P-N type structures. For example, two such bodies with the P zones of the two in mutually perpendicular relation may be employed as illustrated in Fig. 6, each body having incident thereon a respective pair of light beams emanating from the source, the two pairs being produced as by a lens or prism system such as illustrated in Fig. 6.

The invention may be utilized to advantage also in translating or transcribing systems, for example in coding, decoding and information blending systems, two illustrative embodiments being depicted in Figs. 7 and 8. In both these embodiments, there is provided an array or bank of photosensitive bodies 10A, 10B, etc. of the construction shown in Figs. 1 and 2 and described hereinabove, these bodies being disposed in a plane or cylindrical boundary and with the P zones of the several bodies arrayed in various spaced relations with respect to a reference plane transverse to the bodies. A pair of light beams, indicated by $L_1$ and $L_2$, are arranged to scan the bodies in the direction parallel to the reference plane mentioned. Such scanning may be effected by moving the bodies relative to the beams, moving the beams relative to the bodies, or by passing perforated tapes between the light source and the bodies, the tapes having perforations therein representative of information, for example information represented by a code or codes.

If the two beams are in step in their motion relative to the semiconductive bodies 10 and the P zones in these bodies are disposed as illustrated in Fig. 8A, the voltages appearing across the bodies 10 as the beams are incident in succession upon 10A, 10B, 10C and 10D in the order named will be as indicated in Fig. 8B. Specifically, as the beams impinge upon semiconductor 10A, and assuming they impinge thereon at equal distances on opposite sides of the zone 12, the photovoltage appearing across terminals 15 of body 10A is zero; as the beams traverse the other semiconductors, a potential of one sense appears across the body 10B, one of the opposite sense appears between the terminals 15 of 10C and one of first sense appears across the semiconductor 10D.

If the two beams are not in step in their motion relative to the bodies and the P zones are positioned in the manner shown in Fig. 7A, potentials of the forms portrayed in Fig. 7B are developed across the several bodies.

The combinations illustrated in Figs. 7 and 8 may be utilized in a variety of applications. For example, one body 10 may be provided for each channel in a digital coding system and information transcribed by light transmission through slits arranged in accordance with a code pattern in a tape or the like passed between the light source and the semiconductive bodies.

As has been pointed out hereinabove, the polarity of the voltage produced between the terminals of an N-P-N body 10 is determined by on which side of the P zone the light is incident. Thus, the output of such device may be supplied to two channels, polarity-sensitive so that one responds when the light spot falls on one side of the P zone and the other responds when the spot falls on the other side. The two channels may be isolated and one body utilized to supply the two channels on a time separation basis. Also, the information from the two channels may be combined so that when there is an exact coincidence of information from the two channels, specifically from the two light beams, the output of the semiconductor device is zero.

Although several specific embodiments of the invention have been shown and described, it will be understood that they are illustrative and that various modifications may be made therein without departing from the scope and spirit of this invention. For example, although bodies of germanium have been described particularly herein, bodies of silicon may be used in like manner. Also, for example, although the semiconductor bodies have been shown and described as of N-P-N construction they may be of P-N-P construction.

What is claimed is:

1. A photoelectric device comprising a body of semi-conductive material having therein a zone of one conductivity type between and contiguous with a pair of outer zones of the opposite conductivity type, terminal connections to said outer zones, and optical lens means for directing a pair of light beams against said body, each beam incident upon a respective one of said outer zones.

2. A photoelectric device comprising a body of semi-conductive material having therein a P conductivity type zone between and contiguous with a pair of N conductivity type zones, individual electrical connections to said N-type zones, and means comprising an optical lens opposite the body for directing a pair of light beams against said body, each incident upon a respective one of said N-type zones.

3. A photoelectric device in accordance with claim 2 wherein said material is germanium.

4. A photoelectric device in accordance with claim 2 wherein said material is silicon.

5. A photoelectric device comprising a body of semi-conductive material having therein a zone of one conductivity type between and contiguous with a pair of outer zones of the opposite conductivity type, and means for directing a pair of light beams against said body, each beam incident upon a respective one of said outer zones, a load circuit connected between said outer zones, and means for controlling the intensity of one of said light beams in accordance with the current to said load circuit.

6. A photoelectric device comprising a body of germanium having therein a P conductivity type zone sandwiched between two N conductivity type zones, terminal connections to said N-type zones, a pair of light sources, means for concentrating light from one of said sources upon one of said N-type zones, means for directing light from the other of said sources upon the other of said N-type zones, and means controlled in accordance with the photovoltage between said terminal connections for maintaining the intensity of light from said other source in a preassigned relation to the intensity of the light from said one source.

7. A photoelectric device comprising means defining a pair of N-P-N semiconductor junctions extending in two coordinate dimensions, a pair of output terminals for each of said junctions, a light source, and means for dividing light from said source into two pairs of beams, each pair of beams being incident upon a respective one of said junctions with the beams of each pair laterally aligned in a respective one of said coordinate dimensions.

8. A photoelectric device comprising a first body of semiconductive material, a pair of bodies of semiconductive material adjacent and on opposite sides of said first body, each of said bodies having therein an intermediate zone of one conductivity type sandwiched between a pair of outer zones of the opposite conductivity type, terminal connections to the outer zones of each of said bodies, said bodies being positioned with the intermediate zone of said pair of bodies parallel to each other and at a preassigned angle relative to the intermediate zone of said first body, means for directing a pair of light beams against said first body on opposite sides of the intermediate zone therein, and means for directing a second pair of light beams against said pair of bodies, each of said second pair of beams being incident upon a respective one of said pair of bodies.

9. A photoelectric device comprising a plurality of bodies of semiconductive material, each body having therein a zone of one conductivity type sandwiched between two zones of the opposite conductivity type, said bodies being mounted in an array with the zones of said one conductivity type adjacent and substantially parallel to one another and spaced from a reference plane in accordance with a preassigned pattern, at least one of said bodies having its two zones of like conductivity type on opposite sides of said reference plane and said plane extending parallel to said zones of one conductivtiy type, and means for scanning said bodies in succession and in the direction parallel to said plane comprising means for directing a pair of light beams upon said bodies, said light beams being on opposite sides of said reference plane.

REYMOND J. KIRCHER.

References Cited in the file of this patent

UNITED STATES PATENTS

| Number | Name | Date |
|---|---|---|
| 2,402,662 | Ohl | June 25, 1946 |
| 2,560,606 | Shive | July 11, 1951 |
| 2,569,347 | Shockley | Sept. 25, 1951 |